Figure 4:
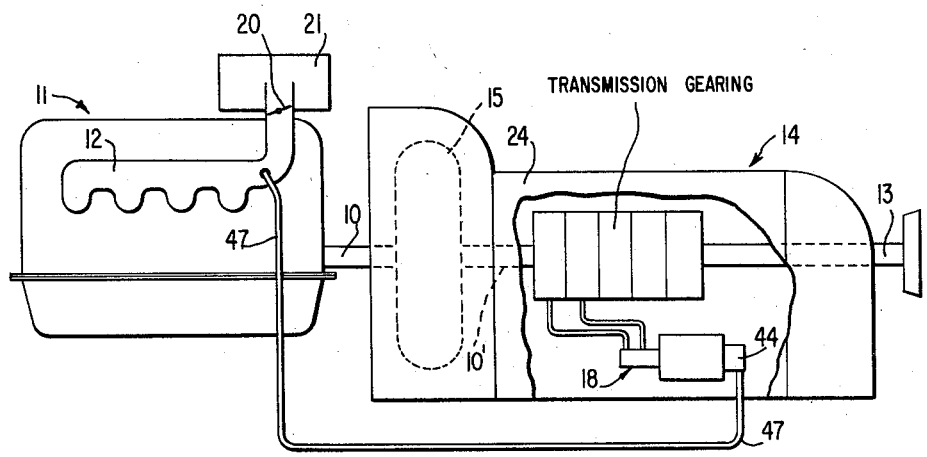

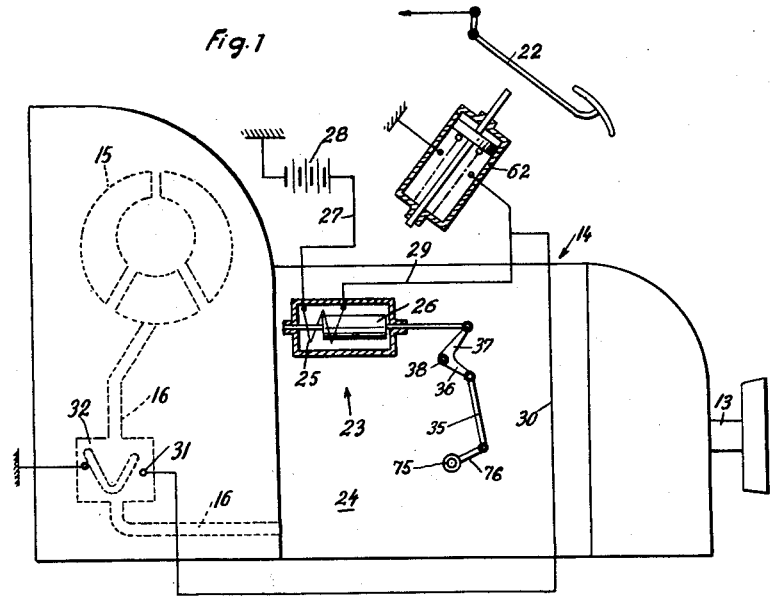
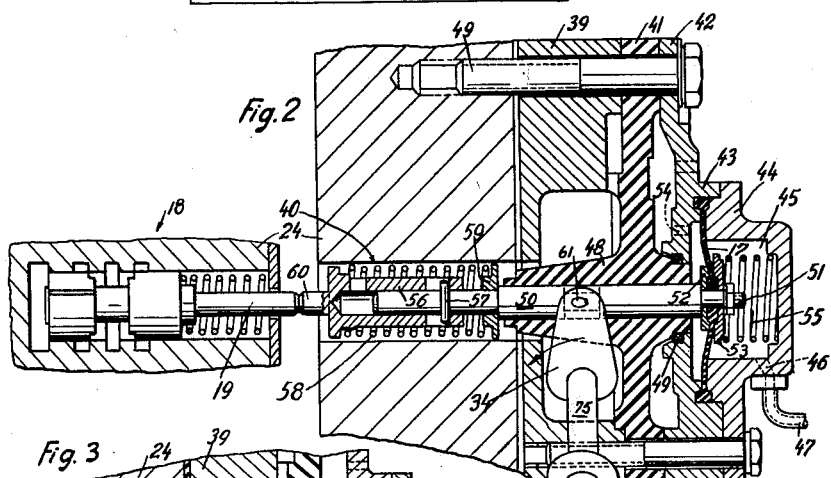
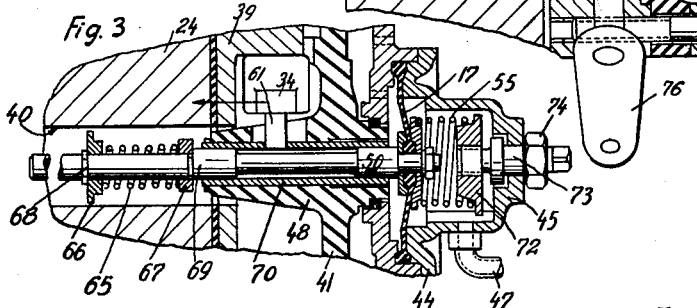
Inventor
HANS-JOACHIM M. FÖRSTER

United States Patent Office 3,165,008
Patented Jan. 12, 1965

3,165,008
CONTROL SYSTEM OF AN AUTOMATIC SPEED CHANGE TRANSMISSION PARTICULARLY FOR AUTOMOBILES
Hans-Joachim M. Förster, Stuttgart-Bad Cannstatt, Germany, assignor to Daimler-Benz Aktiengesellschaft, Stuttgart-Unterturkheim, Germany
Filed May 5, 1961, Ser. No. 118,750
Claims priority, application Germany May 6, 1960
12 Claims. (Cl. 74—472)

My invention relates to a control system of an automatic speed change transmission, particularly for automobiles.

It is the primary object of my invention to provide means for preventing the transmission and, more particularly, a hydrodynamic apparatus included therein, from being heated in operation to excessive temperatures as are liable to be developed under adverse conditions, for instance, when the automobile is driven uphill at a low speed for an extended period of time.

More particularly, it is an object of my invention, to equip the control system of the automatic transmission with temperature-responsive means which will automatically increase the ratio of the speed of the driving shaft to the speed of the driven shaft, when the temperature of the hydrodynamic apparatus included in the transmission rises above a predetermined limit. Owing to this change of the ratio of transmission, the torque transmitted by the hydrodynamic apparatus will be decreased, thus reducing the energy converted into heat therein.

It is a further object of my invention to provide simple inexpensive and reliable temperature-controlled means of the character indicated which can be easily applied to an automatic speed change transmission of a known type without requiring any basic changes thereof.

Further objects of my invention will appear from a detailed description of some preferred embodiments of my invention following hereinafter with reference to the accompanying drawings. I wish it to be understood, however, that my invention is in no way restricted or limited to such embodiments and that the terms and phrases used in such detailed description have been chosen for the purpose of explaining rather than that of restricting or limiting my invention.

In the drawings:

FIG. 1 is a diagrammatic illustration of an automatic automobile speed change transmission and of my novel control system therefor, FIG. 2 is a sectional view of mechanism included in the transmission but not shown in FIG. 1, such mechanism comprising a slide valve and means including a diaphragm for actuating the slidable plunger of said valve, FIG. 3 is a sectional view similar to that of FIG. 2 of a modification of the means shown therein, and FIG. 4 is a diagrammatic illustration of the internal combustion engine and the transmission casing, a partially broken away wall thereof exposing the diagrammatically shown transmission gearing.

In FIGS. 1 and 4 I have illustrated an automatic automobile speed change transmission of the type having an input shaft 10' connected to an internal combustion engine 11 through a hydrodynamic apparatus 15 and an input shaft 10 coupled to the engine which is provided with an intake manifold 12, an output shaft 13 and a train of motion-transmitting elements including automatic change speed transmission gearing which is included in the housing 24 and connects the shafts 10' and 13 at a variable ratio of transmission. The hydrodynamic apparatus 15 may comprise a hydrodynamic clutch or a hydrodynamic torque converter. As such automatic transmissions are well known in the art, a detailed description thereof is deemed dispensable herewith.

A part of the mechanical energy applied to the hydrodynamic apparatus 15 by the input shaft 10 is converted into heat. Under adverse conditions of operation, for instance, when the vehicle is driven uphill at a low speed over an extended period of time, the loss of mechanical energy converted into heat in the apparatus 15 will raise the temperature thereof excessively. This may interfere with the proper operation of the transmission or with the control thereof. The normal speed change program is generally not designed for the operation of the automobile in mountainous territory and, therefore, affords no remedy for such extraordinary driving conditions. A special control program, however, which would be designed for mountainous territory would not meet the requirements in normal territory.

As above stated, it is the object of my invention to provide automatic means for so controlling the transmission that the amount of energy converted into heat in the hydrodynamic apparatus 15 will be automatically reduced as soon as the temperature of the apparatus 15 exceeds a safe limit.

In addition to the hydrodynamic apparatus 15 an epicyclic gearing may be included in the train of motion-transmitting elements and may be interposed between the hydrodynamic device 15 and the output shaft 13. This gearing may take the form, for example, of that shown in applicant's Patent No. 3,103,832. Preferably, the hydrodynamic apparatus is included in a hydraulic circuit which is maintained permanently and includes a supply duct 16 for supplying a suitable liquid, such as oil, to the apparatus 15.

The control system of the automatic transmission shown in FIG. 1 is of a well known type which includes a control member, such as a diaphragm 17, FIGS. 2 and 3, responsive to the vacuum pressure prevailing within the intake manifold 12 and speed ratio-changing means which are coordinated to the train of motion-transmitting elements connecting shafts 10 and 13 for changing the ratio of transmission thereof. In the particular control system to which my invention is shown as being applied by way of example, the speed ratio-changing means coordinated to said train for changing the ratio of transmission thereof includes a slide valve 18 having a movable plunger 19 which is connected to the diaphragm 17 and is operative, when actuated by the diaphragm in response to a relief from the vacuum pressure in the manifold 12, i.e. in response to an opening of the throttle valve 20 of the carburator 21, to change the ratio in a manner increasing the ratio of the speed of the input shaft 10 to the speed of the output shaft 13.

As control systems of this kind are well known and do not form part of my invention, a detailed description thereof is deemed superfluous. It will suffice to state, that the speed ratio-changing device will increase the ratio of the speed of the driving shaft 10 to that of the driven shaft 13, when the driver depresses the accelerator lever 22 to its full extent, thereby opening the throttle valve 20 and/or when the speed of the driven shaft 13 drops below a certain limit.

For the purpose of my invention I have mounted an electromagnet 23 on the outside of the housing 24 of the transmission 14, the electromagnet comprising a coil 25 and an armature 26. In the embodiment shown the electromagnet constitutes a solenoid and the movable core thereof constitutes the armature. The winding 25 has one terminal connected by a wire 27 to one terminal of a battery 28 or another source of current, whereas the other terminal of the battery is grounded. The other terminal of the winding 25 is connected by wires 29 and 30 to a contact 31 of a thermostat 32 which is associated with the transmission and, more particularly, with the hydrodynamic apparatus 15 to be responsive to the temperature thereof. Preferably, the thermostat 32 is mounted within the supply duct 16 and is so grounded that, when the temperature of the oil circulating through the apparatus 15 exceeds a certain limit, it will close an electrical circuit from ground via contact 31, wires 30 and 29, winding 25, wire 27 and battery 28 to ground. In this circuit, the winding 25 will be energized and will cause the armature 26 to be attracted. When the temperature drops below said limit, the circuit will be interrupted again. Preferably, the thermostat has a certain hysteresis which means that the contact-opening temperature is somewhat lower than the contact-closing temperature of the thermostat.

Moreover, a shaft 75 journaled in the wall of the transmission housing 24 and extending therethrough carries an arm 76 on its outer end and an arm 34, FIG. 2, on its inner end. The arm 76 is connected by a link 35 to the lower arm 36 of a bell crank whose upper arm 37 is suitably connected to the core 26 of the solenoid. The bell crank 36, 37 is pivotally mounted on a pin 38 fixed to the housing 24. Therefore, attraction of the core 26 to the left will pivot the bell crank 36, 37 in anticlockwise direction. The bell crank in its turn will rotate shaft 31 in anticlockwise direction as indicated by the arrow in FIG. 2.

An annular plate 39 is mounted on the wall of housing 24 in registry with a bore 40 therethrough and carries a coaxial disk 41 of a suitable heat insulating material. On the disk 41 a plate 42 is mounted provided with a circular flange 43 coaxially disposed with respect to the bore 40. The diaphragm 17 is surrounded by the flange 43 and pressed against the plate 42 by a cup-shaped member 44 which is inserted in the flange 43 and forms a chamber 45 having a port 46 connected by a pipe 47 to the intake manifold 12. The disk 41 is formed with a hub portion 48 having a bore coaxially disposed with respect to the bore 40 and extending into a hole of plate 42 being sealed thereagainst by an annular gasket 49. Moreover, the hub portion 48 extends through the central opening of the annular plate 39. A plurality of threaded bolts 49 extends through the plate 42, the disk 41 and the plate 39 into a threaded bore of the housing wall 24 to thereby hold these elements firmly in position.

A rod 50 slidably guided in the hub portion 48 of the disk 41 has an outer pin 51 which extends through the diaphragm 17 and is firmly connected thereto by a pair of washers 52 and 53 and a suitable nut. The disk 42 is provided with a bore 54 subjecting the inside face of the diaphragm 17 to atmospheric pressure. A helical pressure spring 55 is inserted between the washer 53 and the bottom of the cup-shaped member 44 to thereby counteract the effect of the vacuum pressure in the chamber 45 upon the diaphragm 17.

The elements 42 and 44 constitute an auxiliary housing containing the diaphragm and being mounted on the transmission housing 24.

The rod 50 constitutes one member of a pair of telescope members, the other member being formed by a sleeve 56 disposed within the bore 40 and slidably mounted on the end portion of the rod 50. A pin 57 mounted in a transverse bore of the rod 50 and extending into longitudinal slots of the sleeve 56 constitutes a stop limiting the relative telescoping displacement of the telescope members 50 and 56. A helical spring 58 which surrounds the sleeve 56 and is inserted between an end flange thereof and an annular spring plate 59 fixed to the rod 50 tends to hold the telescope members 50 and 56 in distended condition. The sleeve 56 is integral with an axially extending pin 60 which engages the plunger 19 of the control valve 18. Hence, it will appear, that the elements 50 and 56–60 constitute movable means which are connected to the diaphragm 17 for movement thereby and are mounted to engage and actuate the plunger 19 in response to a relief of the diaphragm 17 from the vacuum pressure causing the spring 55 to urge the rod 50 to the left. Owing to the displacement of the plunger 19 to the left, the valve 18 will cause the transmission to be shifted to a lower speed or, in other words, will increase the ratio of the speed of the driving shaft 10 to that of the driven shaft 13.

The control slide valve 18 is operative in a known manner to so control the pressure of a liquid control medium as to be substantially proportional to the difference between atmospheric pressure and the pressure prevailing within the intake manifold 12.

The arm 34 extends through a slot provided in the hub portion 48 of disk 41 and is provided with a pin 61 which engages a circumferential groove of the rod 50. Therefore, rotation of shaft 75 in anticlockwise direction occurring, when the temperature of the hydrodynamic device 15 exceeds a certain limit, causes the rod 50 to move towards the valve 18 irrespective of the vacuum pressure prevailing in chamber 45. Owing to the consequent increase of the ratio of transmission, the torque transferred to the hydrodynamic apparatus 15 by the driving shaft 10 will be reduced, thereby reducing the energy converted into heat within the hydrodynamic apparatus. As a result, the temperature of the oil passing through the duct 16 will drop again. When this temperature will have dropped below a limit somewhat lower than the temperature limit just referred to, the contact 31 will be opened and the core 26 will be relieved of any electromagnetic forces, thereby permitting the movable means 50 and 56–60, the shaft 75 and the solenoid core 26 linked thereto to be returned to their normal positions by the diaphragm 17 under the effect of the vacuum pressure in chamber 45.

My novel control system described may be readily utilized to produce the so-called "kick-down" control. For that purpose, I may mount an electrical switch 62 beneath the accelerator pedal 22 for actuation thereby, when this pedal is fully depressed. This switch 62, when so actuated, will ground wire 29 independently of the thermostat 32, thereby causing the actuating means formed by the electromagnet 23 to actuate the speed ratio-changing means 18 as described hereinabove.

From the above it will appear that the temperature-responsive means 32 associated with the transmission 14 and, more particularly, with the hydrodynamic apparatus 15 included therein senses the temperature of this apparatus 15 which operates with a certain amount of slippage and will produce a controlling impulse which so controls the automatic transmission that the latter will be automatically shifted, when the temperature exceeds a certain limit, to a speed ratio entailing lower losses of mechanical energy converted into heat. As a result, it will be insured that automatically, without requiring any attention on part of the driver, the hydrodynamic device or other device operating with slippage will always be operated under conditions of a limited energy loss even under extreme conditions of operation. Therefore, the heat produced in the transmission will be kept within safe limits.

The automatic transmissions conventional today are provided with control systems operating in dependence on two control signals. One signal is produced, for instance, by the vacuum pressure prevailing in the intake manifold 12 and the other signal is produced in dependence on the speed of rotation of the driven shaft 13. In my novel control system described hereinabove the impulse produced by the thermostat 32 will affect at least one of these signals in a manner causing the transmission to be set up to an increased speed ratio. Where the transmission is provided with kick-down means permitting the driver to arbitrarily increase the speed ratio of the driving shaft and the driven shaft 13 by kicking down the accelerator pedal, the impulse produced by the temperature-responsive means will act on the control system of the transmission in the same manner as will the kick-down means. Preferably, the heat-responsive means is formed by a thermostat closing a contact when responding to the increase of the temperature above a certain limit, such thermostat being preferably adjustable to different temperatures. Preferably, this thermostat is disposed within the oil supply duct of the hydrodynamic apparatus of the transmission.

The control function effected by the thermostat 32 and resulting in an increase of the speed ratio of shafts 10 and 13 is effected automatically and cannot be interfered with or prevented by the driver. Owing to this function, the transmission will be automatically adjusted to a higher speed ratio or, in other words, to a lower speed in which the loss of energy in the hydrodynamic apparatus and the consequent development of heat will be lower. When the oil has cooled again, the thermostat contact 31 will be opened again causing the speed ratio of shafts 10 and 13 to be reduced again.

The embodiment illustrated in FIG. 3 differs from that shown in FIG. 2 with respect to the following details.

The elements 56–60 have been omitted and the rod 50 is extended towards the plunger 19 for direct contact therewith.

A helical spring 65 surrounding the rod 50 within the bore 40 engages annular spring plates 66 and 67 which are mounted on the rod 50, the spring plate 66 engaging a shoulder 68 thereof, whereas the spring plate 67 engages a shoulder 69 of rod 50 and is movable towards the spring plate 66. A sleeve 70 surrounds rod 50 within the hub portion 48 and has a transverse slot engaged by pin 61 of lever 34. In the normal operation of the transmission the rod 50 will displace valve plunger 19 to a position depending on the vacuum pressure prevailing within the chamber 45, communicating with the intake manifold 12. When in an abnormal operation of the transmission the temperature of the hydrodynamic apparatus 15 rises beyond a certain limit causing the thermostat 32 to close its contact 31, the electromagnet 23 will be energized imparting an anticlockwise pivotal movement to lever arm 34. Pin 61 of this lever arm will move the sleeve 70 towards the left with reference to FIG. 3 into engagement with the spring plate 67 displacing the latter on the rod 50 towards the spring plate 66, thereby biasing the helical spring 65. The force of spring 65 will act on rod 50 in addition to the force of the spring 55 disposed within the diaphragm chamber 45. Under the combined action of the two springs the rod 50 will displace the valve plunger 19 towards the left causing the latter to so control the pressure of the liquid control medium that a lower speed will be set up in the transmission, thus increasing the ratio of the speeds of shafts 10 and 13.

The spring 55 is preferably adjustable. For this purpose it may engage an annular spring plate 72 provided within the auxiliary diaphragm housing 44 and carried by a movable stem 73 held in adjusted position by a nut 74.

Upon de-energization of magnet 23, the spring 65 will move the annular spring plate 67 and the sleeve 70 on the rod 50 towards the right until the spring plate 67 reengages the shoulder 69.

The advantages of the invention as here outlined are best realized when all of its features and instrumentalities are combined in one and the same structure, but useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

From the foregoing it will be seen that this invention is one well adapted to attain all of the ends and objects hereinabove set forth, together with other advantages which are obvious and which are inherent to the combination.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a control system of an automatic speed change transmission of the type having an input shaft, an output shaft, and motion-transmitting means connecting said shafts at a variable ratio of transmission including a hydrodynamic apparatus having a supply duct for supply of a fluid thereto, the combination comprising speed ratio-changing means operatively connected to said motion-transmitting means and operative upon actuation to increase the ratio of the speed of said input shaft to the speed of said output shaft, actuating means for such speed ratio changing means, and temperature responsive means mounted in said supply duct of said hydrodynamic apparatus and being responsive to the temperature in said supply duct, said temperature responsive means being operatively connected with said actuating means so that when the temperature of said fluid exceeds a predetermined limit said actuating means actuates said speed ratio-changing means.

2. In the control system of an automatic speed change transmission having an input shaft coupled to an internal combustion engine provided with an intake manifold, an output shaft, and motion-transmitting means connecting said shafts at a variable ratio of transmission and including a hydrodynamic apparatus having a fluid supply duct, the combination comprising temperature responsive means within said supply duct, speed ratio changing means, control means for said speed ratio changing means including a slide valve having a plunger element, actuating means for said plunger element including diaphragm means provided within said housing means and responsive to the vacuum pressure prevailing within said intake manifold, further actuating means for said plunger element, said further actuating means comprising means operatively connected with said temperature responsive means for control by the latter, said further actuating means being effective to actuate said plunger to move said slide valve to a position to increase the ratio of the speed of said input shaft to said output shaft when said temperature within said supply duct exceeds a predetermined limit.

3. In the control system as claimed in claim 1 further comprising kick-down means operatively connected with said actuating means and operative independently of said temperature-responsive means, when kicked down, to cause said actuating means to actuate said speed ratio-changing means.

4. In a combination set forth in claim 2 further comprising kick-down means operatively connected with said actuating means and operative independently of said temperature-responsive means, when kicked down, to cause said actuating means to actuate said speed ratio-changing means.

5. In the control system claimed in claim 1, in which said temperature-responsive means is formed by a thermostat equipped with an electrical contact and in which said actuating means is formed by an electromagnet controlled by said contact, said combination further comprising kick-down means including a switch connected with said electromagnet independently of said thermostat and operative, when kicked down by the driver, to cause said electromagnet to actuate said speed ratio-changing means.

6. In the control system of an automatic automobile speed change transmission of the type having an input shaft coupled to an internal combustion engine provided with an intake manifold, an output shaft, and motion-transmitting means connecting said shafts at a variable ratio of transmission and including a hydrodynamic apparatus, the combination comprising housing means, a diaphragm provided within said housing means and responsive to the vacuum pressure prevailing within said intake manifold, speed ratio-changing means operatively connected to said motion-transmitting means for changing the ratio of transmission thereof and control means for controlling said speed ratio changing means, said control means including a slide valve having a movable plunger adapted to be actuated by said diaphragm and operative, when actuated thereby in response to a relief of said pressure to move said slide valve to change said ratio in a manner increasing the ratio of the speed of said input shaft to the speed of said output shaft, a thermostat operatively connected with said hydrodynamic apparatus to respond to the temperature prevailing therein, an electrical contact included in said thermostat to be actuated, when the temperature of said hydrodynamic apparatus exceeds a certain limit, an electromagnet having a winding connected to said contact for control thereby and having an armature, and means operatively connected to said plunger and to said armature for enabling the latter to actuate said plunger independently of said vacuum pressure.

7. The combination claimed in claim 6 in which said last mentioned means includes a lever connected with said armature to be pivotally moved thereby, said combination further comprising movable means connected to said diaphragm for movement thereby and mounted to engage and actuate said plunger, said lever being connected to said movable means for moving same independently of said vacuum pressure.

8. The combination claimed in claim 7 in which said movable means comprises a pair of telescoping members, a stop associated with said telescope members to limit the relative telescoping displacement thereof and a spring connected to said telescoping members and tending to hold them in distended condition.

9. The combination claimed in claim 7 in which said movable means comprises a rod, said combination further comprising a sleeve slidably mounted on said rod and connected to said lever, and a spring acting on said rod and coordinated to said sleeve to be biased thereby.

10. The combination claimed in claim 9 further comprising a pair of annular spring plates on said rod with said spring mounted therebetween, one of said spring plates being fixed to said rod and the other spring plate being movable thereon, said sleeve being movable between said other spring plate and said diaphragm.

11. The combination claimed in claim 6 in which said transmission has a housing, said housing means for said diaphragm further comprising an auxiliary housing on said transmission housing, and a plate of heat insulating material interposed between said housings.

12. The combination claimed in claim 6 in which said transmission has a housing, said combination further comprising a plate of heat insulating material mounted on said housing and provided with a hub portion coaxially disposed with respect to said movable plunger, movable means connected to said diaphragm for movement thereby and slidably mounted within said hub portion to engage and actuate said plunger, said hub portion being provided with an aperture and a lever arm cooperatively connected with said armature for movement thereby and extending through said aperture into engagement with said movable means.

References Cited in the file of this patent
UNITED STATES PATENTS

| | | |
|---|---|---|
| 2,415,894 | Lemon | Feb. 18, 1947 |
| 2,457,692 | La Brie | Dec. 28, 1948 |
| 2,689,030 | Wemp | Sept. 14, 1954 |
| 2,720,124 | Polomski | Oct. 11, 1955 |